United States Patent
Purcell et al.

(10) Patent No.: US 11,048,703 B2
(45) Date of Patent: Jun. 29, 2021

(54) MINIMIZING PROCESSING USING AN INDEX WHEN NON LEADING COLUMNS MATCH AN AGGREGATION KEY

(71) Applicant: International Business Machines Corporation, Armonk, NY (US)

(72) Inventors: Terence P. Purcell, Springfield, IL (US); Thomas A. Beavin, Milpitas, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/447,658

(22) Filed: Jun. 20, 2019

(65) Prior Publication Data
US 2019/0324965 A1 Oct. 24, 2019

Related U.S. Application Data

(63) Continuation of application No. 15/895,423, filed on Feb. 13, 2018.

(51) Int. Cl.
*G06F 16/2453* (2019.01)
*G06F 16/2455* (2019.01)
*G06F 16/248* (2019.01)

(52) U.S. Cl.
CPC ...... *G06F 16/24542* (2019.01); *G06F 16/248* (2019.01); *G06F 16/24554* (2019.01)

(58) Field of Classification Search
CPC ......... G06F 16/24542; G06F 16/24554; G06F 16/248
See application file for complete search history.

(56) References Cited

U.S. PATENT DOCUMENTS

| 6,266,658 B1 | 7/2001 | Adya et al. |
| 7,020,647 B1 | 3/2006 | Egan et al. |
| 7,747,606 B2 | 6/2010 | Dageville et al. |
| 9,135,299 B2 | 9/2015 | Burger |

(Continued)

OTHER PUBLICATIONS

G. Valentin et al., "DB2 advisor: An Optimizer Smart Enough to Recommend Its Own Indexes," dated 2000, In Data Engineering, 2000. Proceedings. 16th International Conference on, pp. 101-110. IEEE, Retrieved from Internet using: http://wwwiti.cs.uni-magdeburg.de/~eike/selftuning/sources/db2_advisor.pdf, Total 10 pages.

(Continued)

*Primary Examiner* — Kannan Shanmugasundaram
(74) *Attorney, Agent, or Firm* — Konrad, Raynes, Davda and Victor LLP; Janaki K. Davda

(57) ABSTRACT

Provided are techniques for minimizing processing using an index when non-leading columns match an aggregation key. A query that includes a clause and an aggregation key is received. It is determined that a non-leading key column of an index matches a column of the aggregation key comprising any of: a leading column of an ORDER BY aggregation key, any column of a duplicate removal aggregation key, a MIN aggregation key, and a MAX aggregation key. The clause is processed using an order of the aggregation key to generate a first result set. Then, the clause is processed using the non-leading key column of the index that matched the column of the aggregation key and the first result set to generate a second result set. The second result set is returned.

6 Claims, 9 Drawing Sheets

(56) References Cited

U.S. PATENT DOCUMENTS

| | | | |
|---|---|---|---|
| 2008/0046473 A1 | 2/2008 | Miao et al. | |
| 2008/0077557 A1 | 3/2008 | Schneider et al. | |
| 2008/0256047 A1* | 10/2008 | Dettinger | G06F 16/90335 707/999.004 |
| 2009/0063458 A1 | 3/2009 | Beavin et al. | |
| 2010/0036799 A1* | 2/2010 | Bouloy | G06F 16/24544 707/714 |
| 2014/0337389 A1* | 11/2014 | Ricketts | G06F 16/211 707/803 |
| 2015/0220595 A1 | 8/2015 | Purcell et al. | |
| 2015/0220596 A1* | 8/2015 | Purcell | G06F 16/2228 707/715 |

OTHER PUBLICATIONS

K. Sattler et al. "Quiet: Continuous Query-Driven Index Tuning," dated 2003, In Proceedings of the 29th International Conference on Very Large Data Bases—vol. 29, VLDB Endowment. Retrieved from Internet using: http://www.vl G. Valentin b.org/conf/2003/papers/S37P05.pdf, Total 4 pages.

M. Luhring et al. "Autonomous Management of Soft Indexes," dated 2007, In Data Engineering Workshop, IEEE 23rd International Conference on, Retrieved from Internet using: https://pdfs.semanticscholar.org/9aed/8d890ad0a054f645871a720e46f9032991ab.pdf, Total 9 pages.

Mell et al., "Effectively and Securely Using the Cloud Computing Paradigm", dated Oct. 7, 2009, NIST, Information Technology Laboratory, Total 80 pages.

Mell et al., "The NIST Definition of Cloud Computing" dated Sep. 2011, Computer Security Division Information Technology Laboratory National Institute of Standards and Technology, Total 7 pages.

N. Srivastava "Oracle Database Internal Mechanism—Index Skip Scans", dated Dec. 29, 2016, (online), retrieved from the Internet at : https://databaseinternalmechanism.com/2016/12/29/index-skip-scans/, Total 6 pages.

US Patent Application, dated Feb. 13, 2018 for U.S. Appl. No. 15/895,423, filed Feb. 13, 2018, invented by Terance P. Purcell et al., Total 37 pages.

Preliminary Amendment, dated Jun. 20, 2019 for U.S. Appl. No. 15/895,423, filed Feb. 13, 2018, invented by Terance P. Purcell et al., Total 5 pages.

List of Patents and Applications Treated as Related, dated Jun. 20, 2019, Total 2 pages.

Office Action, dated Mar. 11, 2020,for U.S. Appl. No. 15/895,423, filed Feb. 13, 2018, invented by Terance P. Purcell et al., Total 20 pages.

Response to Office Action, dated Jun. 11, 2020, for U.S. Appl. No. 15/895,423, filed Feb. 13, 2018, invented by Terance P. Purcell et al., Total 14 pages.

Final Office Action, dated Sep. 16, 2020, for U.S. Appl. No. 15/895,423, filed Feb. 13, 2018, invented by Terance P. Purcell et al., Total 11 pages.

Response to Final Office Action, dated Dec. 15, 2020, for U.S. Appl. No. 15/895,423, filed Feb. 13, 2018, invented by Terance P. Purcell et al, Total 12 pages.

Notice of Allowance, dated Jan. 22, 2021, for U.S. Appl. No. 15/895,423, filed Feb. 13, 2018, invented by Terance P. Purcell et al., Total 9 pages.

* cited by examiner

MINIMIZING PROCESSING USING AN INDEX WHEN NON LEADING COLUMNS MATCH AN AGGREGATION KEY

FIELD

Embodiments of the invention relate to minimizing processing using an index when non-leading columns of the index match columns of an aggregation key. That is, embodiments relate to minimizing processing using an index with leading columns that do not match the aggregation key. In particular, embodiments related to minimizing sorting, grouping, duplicate removal and min/max processing using an index with leading columns that do not match the aggregation key.

BACKGROUND

A DataBase Management System (DBMS) may use Structured Query Language (SQL) statements ("queries"). The SQL statements have evolved into a standard language for DBMS software. The DBMS uses SQL statements for storing and retrieving data in a database. The database is organized into tables that consist of rows (also referred to as tuples or records) and columns (also referred to as fields or attributes) of data.

A table in a database may be accessed using an index. An index is an ordered set of references (e.g., pointers) to the rows in the table. The index is used to access each row in the table using a key (i.e., one of the fields or attributes of the row, which corresponds to a column). The term "key" may also be referred to as "index key" for an index. Without an index, finding a row requires a scan (e.g., linearly) of an entire table. Indexes provide an alternate technique to accessing data in a table. Users can create indexes on a table after the table is built. An index is based on one or more columns of the table.

A query may be described as a request for information from a database based on specific conditions. A query typically includes one or more predicates. A predicate may be described as an element of a search condition that expresses or implies a comparison operation (e.g., A=3).

Sorting, grouping, and duplicate removal processing is common in query workloads. However, these operations require a lot of processing.

Some solutions currently implemented by DBMSs for sorting 1) utilize indexes that match the sort key to avoid sort or 2) perform sorting/hashing when indexes cannot provide the desired order.

With some conventional techniques, all rows are internally fetched and passed into sort before any row is returned back to the application.

SUMMARY

Provided is a computer-implemented method for minimizing processing using an index when non-leading columns match an aggregation key. The method comprises: receiving, with a processor of a computer, a query that includes a clause and an aggregation key; determining, with the processor of the computer, that a non-leading key column of an index matches a column of the aggregation key comprising any of: a leading column of an ORDER BY aggregation key, any column of a duplicate removal aggregation key, a MIN aggregation key, and a MAX aggregation key; processing, with the processor of the computer, the clause using an order of the aggregation key to generate a first result set; processing, with the processor of the computer, the clause using the non-leading key column of the index that matched the column of the aggregation key and the first result set to generate a second result set; and returning, with the processor of the computer, the second result set.

Provided is a computer program product for minimizing processing using an index when non-leading columns match an aggregation key. The computer program product comprises a computer readable storage medium having program code embodied therewith, the program code executable by at least one processor to perform: receiving a query that includes a clause and an aggregation key; determining that a non-leading key column of an index matches a column of the aggregation key comprising any of: a leading column of an ORDER BY aggregation key, any column of a duplicate removal aggregation key, a MIN aggregation key, and a MAX aggregation key; processing the clause using an order of the aggregation key to generate a first result set; processing the clause using the non-leading key column of the index that matched the column of the aggregation key and the first result set to generate a second result set; and returning the second result set.

Provided is a computer system for minimizing processing using an index when non-leading columns match an aggregation key. The computer system comprises: one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations comprising: receiving a query that includes a clause and an aggregation key; determining that a non-leading key column of an index matches a column of the aggregation key comprising any of: a leading column of an ORDER BY aggregation key, any column of a duplicate removal aggregation key, a MIN aggregation key, and a MAX aggregation key; processing the clause using an order of the aggregation key to generate a first result set; processing the clause using the non-leading key column of the index that matched the column of the aggregation key and the first result set to generate a second result set; and returning the second result set.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

With embodiments, a minimizing aggregation approach provides computing efficiency by reducing or eliminating processing for sorting, grouping, and duplicate removal processing. In this manner, the minimizing aggregation approach improves query workload performance by the computer.

The minimizing aggregation approach leverages existing indexes to reduce and, in some cases, avoid altogether the processing needed to perform sorting, grouping and duplicate removal. The minimizing aggregation approach obtains benefits by leveraging existing indexes and avoids creating new, additional indexes that would be needed to support many possible orderings that a query may specify. Reducing the requirement for additional indexes will benefit all database maintenance operations including INSERT, UPDATE, and DELETE.

Figure 1:
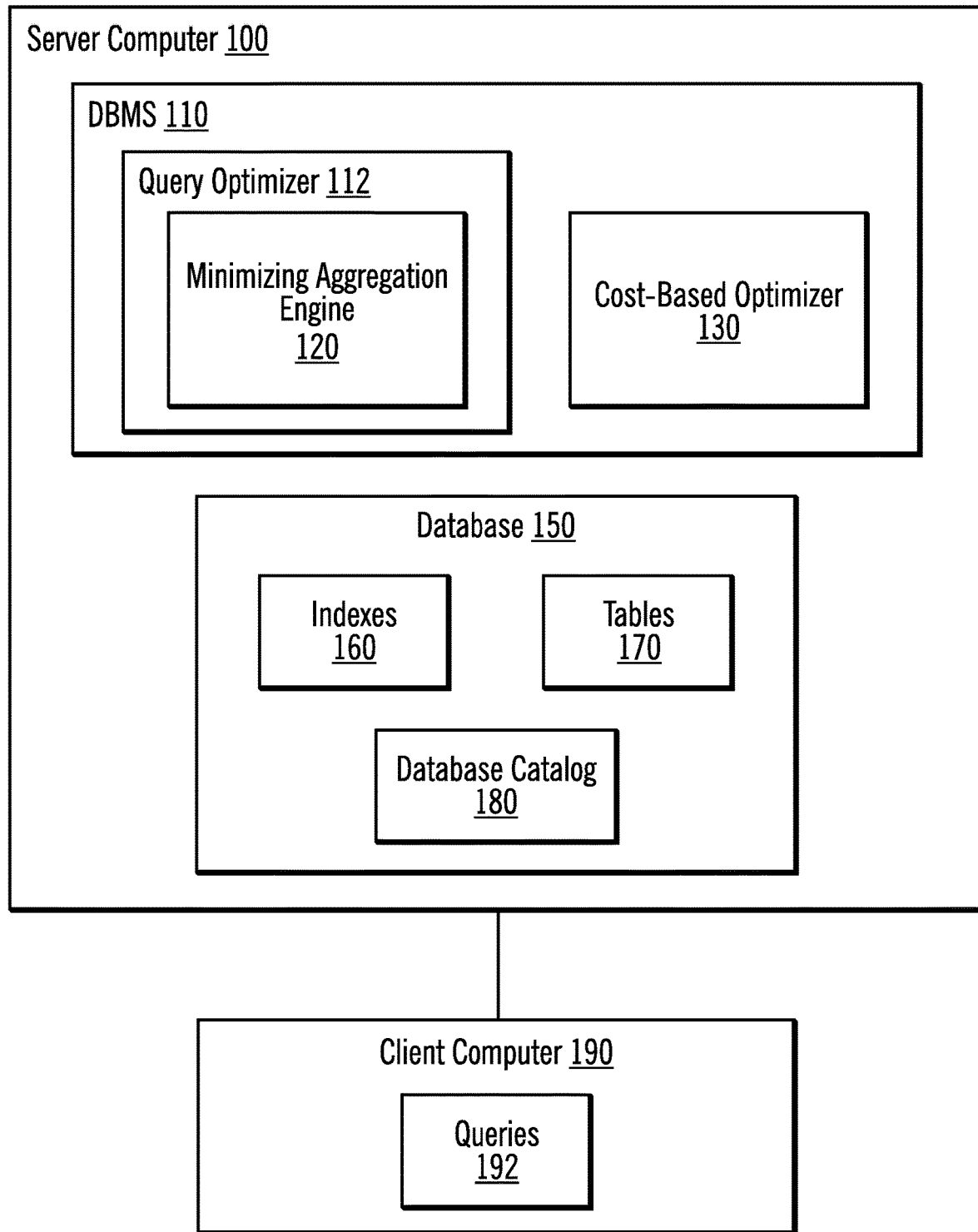
FIG. 1 illustrates, in a block diagram, a computing environment in accordance with certain embodiments.

FIG. 1 illustrates, in a block diagram, a computing environment in accordance with certain embodiments. In FIG. 1, a server computer 100 is coupled to a client computer 190. The server computer 100 includes DataBase Management System (DBMS) 110 and database 150. The client computer 190 issues queries 192 to the server computer 100. The DBMS 110 includes a query optimizer 112 and a cost-based optimizer 130. The query optimizer 112 includes a minimizing aggregation engine 120. The DBMS 110, query optimizer 112, and minimizing aggregation engine 120 execute the queries 192. The database 150 includes indexes 160, tables 170, and a database catalog 180. The database catalog 180 may be described as tables and indexes owned by the DBMS 110 with, for example, statistical information about other tables.

With embodiments, an aggregation key refers to any of: a sort key, any column of a grouping key or any column of a duplicate removal key. Thus, the aggregation keys may be referred to herein as a sort aggregation key, a grouping aggregation key or a duplicate removal aggregation key.

The minimizing aggregation engine 120 works efficiently in cases in which the leading columns of the index do not match a leading subset of the aggregation keys specified in a clause. For example, if the leading columns of the index are A, B, C, while the aggregation keys specified in the clause are B, C, the non-leading columns of the index (B, C) match the aggregation keys (B, C).

An alternative partial ordering approach provides partial ordering as a way to reduce sorting, grouping, and duplicate removal processing. With the partial ordering approach, when the leading columns of the index match a leading subset of the aggregation key needed for sorting, grouping or duplicate removal, the partial order provided by the index may be used to reduce the sorting, grouping or duplicate removal processing.

Such a technique is useful when the cardinality of that leading set of columns is high relative to the cardinality of the full aggregation key to be sorted, grouped or used for duplicate removal. The following is Example (1):

SELECT LAST_NAME, PHONE_NUMBER
    FROM PHONE_BOOK
    ORDER BY LAST_NAME, PHONE_NUMBER;
    Index on LAST_NAME, FIRST_NAME.

The index on LAST_NAME, FIRST_NAME may be used to reduce the sorting for ORDER BY LAST_NAME, PHONE_NUMBER. Because the aggregation keys are ordered by LAST_NAME, sort only needs to order aggregation keys with duplicate LAST_NAME values by PHONE_NUMBER. This is a faster sort than would be required if the aggregation keys were not already in LAST_NAME order. In addition, rows may be returned faster to the application because, as soon as a change in the value of LAST_NAME occurs, the set for the previous LAST_NAME value, which are now ordered by PHONE_NUMBER, may be returned to the application. As indicated above, this partial ordering approach is useful (but not limited to situations) when the cardinality of LAST_NAME is high, such that there are few duplicate LAST_NAME values.

Initially, the minimizing aggregation engine 120 performs index qualification. At query optimization and compilation time, the minimizing aggregation engine 120 qualifies an index by looping through all indexes and searching through each of the indexes to find the first column of the sort aggregation key, any column of the grouping aggregation key or any column of the duplicate removal aggregation key.

If a column is found on the leading column of the index, then that index is a candidate for the partial ordering approach for sort avoidance and/or sort minimization. The minimizing aggregation engine 120 repeats this process with the next column of each of the indexes, searching for the next column of the sort aggregation key, any column of the grouping aggregation key or any column of the duplicate removal aggregation key.

If no column is found for the leading column of the index (and there is no 'col=literal' predicate on that column, and the proceeding set of columns in the index are not unique) then the minimizing aggregation engine 120 continues searching through the indexes with the next column in the index for a match with a column of the sort aggregation key, any column of the grouping aggregation key or any column of the duplicate removal aggregation key. If a match is found on any of the subsequent columns, then the index is a candidate for the minimizing aggregation approach. With embodiments, all indexes are evaluated by the query optimizer 112 using the cost-based optimizer 130. Evaluation for minimizing aggregation is one of the many criteria that may be considered by the cost-based optimizer 130. For example, there may be five indexes on a table, and two of those indexes have columns that allow them to qualify for minimizing aggregation, but the other three indexes have columns that are better suited to the WHERE/ON clause predicates. So, the cost-based optimizer 130 takes this into consideration when evaluating the cost of each index, and those minimizing aggregation candidates are likely have a lower sort cost.

With embodiments, this check is done so that if you have an equals predicate, then you can exclude that column from the ordering requirement. For example, if there is an index on LASTNAME, FIRSTNAME and a query of Example (2):
SELECT*
FROM PHONEBOOK
WHERE LASTNAME='SMITH'
ORDER BY FIRSTNAME With reference to Example (2), although the ORDER BY is on the 2nd column of the index, there is an equals predicate on LASTNAME, so the index already provides order.

With embodiments, if the index columns that match a GROUP BY or DISTINCT clause are already unique after excluding any columns with equal predicates, then the query optimizer 112 recognizes this and ignores the DISTINCT or GROUP BY clause.

Figure 2:
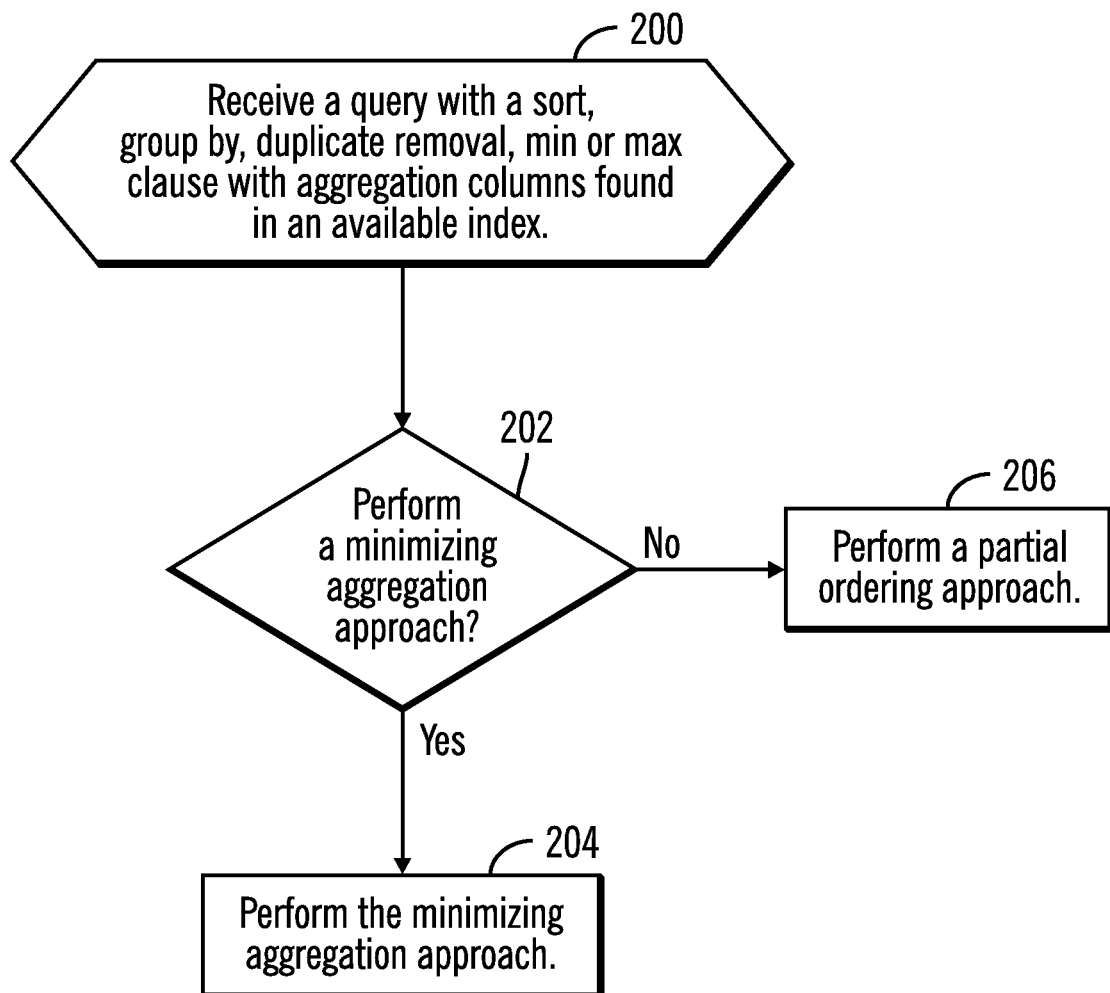
FIG. 2 illustrates, in a flow chart, operations for determining whether to perform a minimizing aggregation approach in accordance with certain embodiments.

FIG. 2 illustrates, in a flow chart, operations for determining whether to perform a minimizing aggregation approach in accordance with certain embodiments. With embodiments, this is done before starting execution of a query. Control begins at block 200 with the minimizing aggregation engine 120 receiving a query with a sort, group by, duplicate removal, min or max clause with aggregation columns found in an available index. In block 202, the minimizing aggregation engine 120 determines whether to perform a minimizing aggregation approach. If so, processing continues to block 204, otherwise, processing continues to block 206. In block 204, the minimizing aggregation engine 120 performs the minimizing aggregation approach. In block 206, the minimizing aggregation engine 120 performs a partial ordering approach.

The following is Example (3):
SELECT CITY, ZIPCODE, SUM(SALES_AMT)
FROM SALES
GROUP BY CITY, ZIPCODE;
Index on STATE, CITY, ZIPCODE With Example (3), the index is on columns STATE, CITY, ZIPCODE (in that order), and so the index does not provide the exact order needed by the GROUP BY aggregation key, which is CITY, ZIPCODE. The index has a leading index column STATE, which is not in the GROUP BY aggregation key. With Example (3), the index does order the rows within each STATE.

Using Example (3), the index on STATE, CITY, ZIP-CODE qualifies for the minimizing aggregation approach (instead of the partial ordering approach) because STATE does not match to the GROUP BY aggregation key, but a subsequent column, CITY, does match.

The minimizing aggregation engine 120 leverage indexes that do not match the sorting/grouping aggregation key and do not have a leading set of columns that match a subset of the sorting/grouping aggregation key, to reduce (e.g., in the case of Example (3)), and, in some case, eliminate the processing needed for sorting/grouping and duplicate removal. With reference to Example (3), the minimizing aggregation engine 120 leverages the index, which does not match the GROUP BY clause and does not have a leading column that matches a subset of the GROUP BY clause.

Therefore, the minimizing aggregation engine 120 performs a first round of grouping within each STATE value by computing:
SUM(SALES) for GROUP BY STATE, CITY, ZIP-CODE.

In Example (3), the index does not provide the exact order needed by the GROUP BY clause. However, the index does order the rows within each STATE value in the order needed.

As a result, the first round of grouping may be done within each STATE value. That is, for each STATE value, the minimizing aggregation engine 120 groups by CITY, ZIPCODE and computes SUM(SALES_AMT) for that combination of STATE, CITY, ZIPCODE to generate a first result set.

Then, the minimizing aggregation engine 120 performs a second round of grouping by computing:
SUM(SALES) for GROUP BY CITY, ZIPCODE.

That is, the second round of grouping computes the SUM of the sums computed in the first round of grouping for each CITY, ZIPCODE combination. Thus, the second round of grouping uses the first result set to generate a second result set.

This second round may be performed after the first round, as a separate aggregation operation. However, with embodiments, it may be more efficient if the second round is nested within the first round, such that the processing is overlapped and avoids any need to rescan of the results of the first round. This overlapping is possible because in the first round each set of CITY, ZIPCODE values are ordered within STATE. The second round, therefore, needs to merge the ordered CITY, ZIPCODE values from each STATE. This is similar to a 50-way MERGE operation (in this case 50 comes from the cardinality of the STATE column), where each of the 50 streams to be merged is already ordered.

Processing can be further optimized by using parallelism to initiate 50 concurrent read tasks, each one reading a different STATE value and doing the first round of aggregation. The results of the 50 concurrent read tasks are merged by the parent task, which also performs the second round of aggregation.

In this way, the sort operation has been reduced to a merge operation of ordered streams that each leverage the existing index. This is more efficient than a full sort as is done in conventional systems, and also produces the first rows quickly, without requiring all the rows to first be passed into sort before the first qualified row is returned to the application.

With reference to Example (3), since CITY, ZIPCODE are ordered within STATE, for the lower (leading) cardinality columns, there is sequential processing with the minimizing aggregation engine 120 reading the ordered CITY, ZIP-CODE values per STATE and merging the ordered sets. Also, for the higher (leading) cardinality columns, the minimizing aggregation engine 120 consolidates duplicates as input to sort. This consolidation uses full aggregation key (thus aggregation key order). Also, the minimizing aggregation engine 120 uses hashing/sorting of GROUP BY columns after the first round consolidation. Moreover, uninteresting columns may be removed for hashing/sorting.

Figure 3:
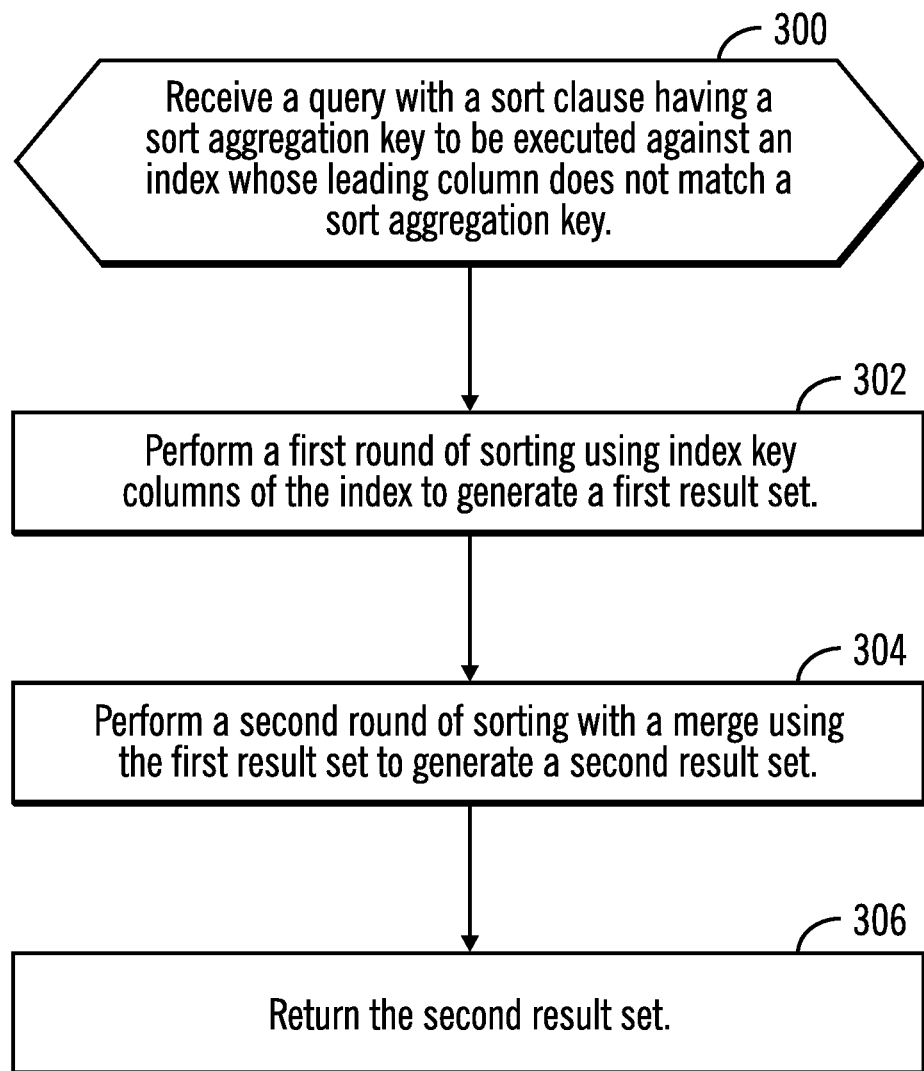
FIG. 3 illustrates, in a flow chart, operations for processing a sort clause in accordance with certain embodiments.

FIG. 3 illustrates, in a flow chart, operations for processing a sort clause in accordance with certain embodiments. Control begins at block 300 with the minimizing aggregation engine 120 receiving a query with a sort clause having a sort aggregation key to be executed against an index whose leading column does not match a column of the sort aggregation key. In block 302, the minimizing aggregation engine 120 performs a first round of sorting using index key columns of the index to generate a first result set. In block 304, the minimizing aggregation engine 120 performs a second round of sorting with a merge using the first result set to generate a second result set. In block 306, the minimizing aggregation engine 120 returns the second result set.

The minimizing aggregation engine 120 provides duplicate removal. The discussion above focused on GROUP BY processing to perform aggregation of data. The next example changes this to a duplicate removal case. The following is Example (4):

SELECT DISTINCT CITY, ZIPCODE
FROM SALES
ORDER BY CITY, ZIPCODE;
Index on STATE, CITY, ZIPCODE The DISTINCT term indicates that duplicates are to be removed. In Example (4), the index on STATE, CITY, ZIPCODE is qualified the same way as in Example (3). The index processing, however, is different because not all rows need to be looked at. In this case, the minimizing aggregation engine 120 skips over rows with duplicate CITY, ZIPCODE values when possible. This may be done by enabling a duplicate skipping mechanism. The duplicate skipping mechanism is available as a feature of traditional DBMSs and utilizes leading key columns of the index to skip over duplicates for grouping/duplicate removal queries. However, given that the DISTINCT aggregation key columns do not match the index key columns, the existing approach of duplicate skipping is not applicable. The minimizing aggregation engine 120 introduces an intermediate process to exploit the duplicate skipping mechanism by introducing the leading index columns to the DISTINCT clause, such as SELECT DISTINCT STATE, CITY, ZIPCODE. The duplicate skipping mechanism can therefore skip over duplicate STATE, CITY, ZIPCODE aggregation keys when scanning the index. Alternatively, these duplicates may be removed during the index scan if the duplicate skipping feature is not available.

With embodiments, a first round of duplicate removal utilizes index order to generate a first result set. After the first round of duplicate removal is done, a second round is performed to remove duplicate CITY, ZIPCODE values that appear in different STATE values of the first result set to generate a second result set.

As in the previous GROUP BY example, using parallelism it is also possible to initiate 50 read tasks to do the first round of duplicate removal in parallel if the duplicate skipping feature is not available in the DBMS, and feed a parent task with the results that simply merge the results and removes duplicates that occur as a result of the merge.

If it can be determined that CITY, ZIPCODE is correlated to STATE, such that a given CITY, ZIPCODE has only one associated STATE value, then this second round of duplicate removal may be avoided. However, the merge process is performed because the result is ordered by CITY, ZIPCODE in this example. This merge process is still more efficient than a full sort. The second round of duplicate removal may use hashing/sorting or merge based upon column cardinality.

Figure 4:
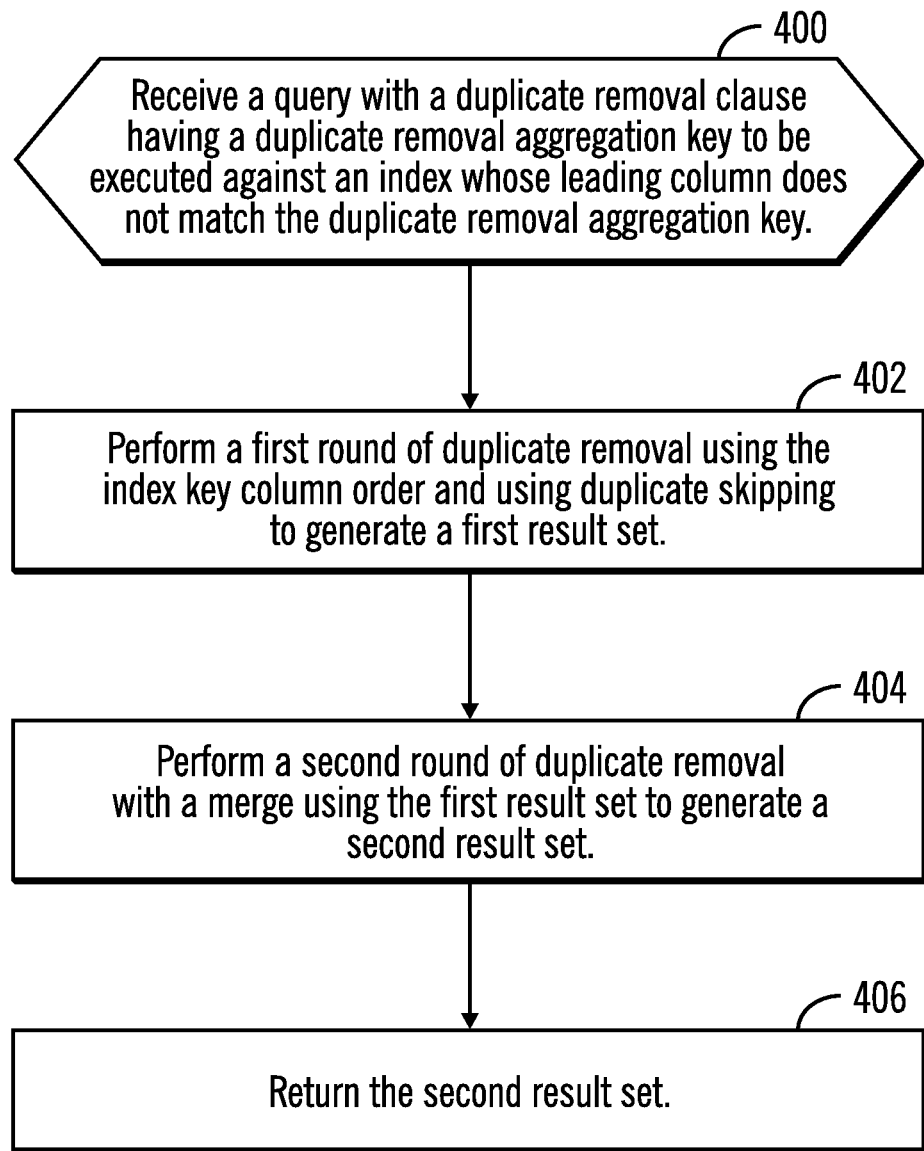
FIG. 4 illustrates, in a flow chart, operations for processing a duplicate removal clause in accordance with certain embodiments.

FIG. 4 illustrates, in a flow chart, operations for processing a duplicate removal clause in accordance with certain embodiments. Control begins at block 400 with the minimizing aggregation engine 120 receiving a query with a duplicate removal clause having a duplicate removal aggregation key to be executed against an index whose leading column does not match the duplicate removal aggregation key. In block 402, the minimizing aggregation engine 120 performs a first round of duplicate removal using the index key column order and using duplicate skipping to generate a first result set. In block 404, the minimizing aggregation engine 120 performs a second round of duplicate removal with a merge using the first result set to generate a second result set. In block 406, the minimizing aggregation engine 120 returns the second result set.

The minimizing aggregation engine 120 provides MIN/MAX optimization. Such optimization is possible for cases involving MIN or MAX. The following is Example (5):

SELECT MIN(CITY)
FROM SALES;
Index on STATE, CITY, ZIPCODE

In this case, some processing may be avoided by taking advantage of the order provided by the index on STATE, CITY, ZIPCODE. As in the previous Examples (3) and (4), the index provides ordering on CITY within STATE. By scanning the index in forward sequence, and skipping over duplicate STATE aggregation keys using the duplicate skipping feature, the query looks at 50 rows at most to determine the smallest value of CITY. Again, this is made possible by recognizing that CITY is ordered within STATE and exploiting that characteristic of the index.

That is, Example (5) utilizes index order to determine the MIN(CITY) for each STATE. Duplicate skipping may be employed to reduce the number of rows read/processed Embodiments keep track of the MIN(CITY), discarding any value larger, and replacing MIN when a lower value is observed. To exploit the duplicate skipping feature however, an intermediate operation is introduced similar to Examples (3) and (4) that matches the SELECT list to the index keys such as SELECT STATE, MIN(CITY) to allow duplicate skipping to skip over the duplicate STATE values and process only the first (minimum) CITY within each STATE key.

Embodiments avoid the query performing a full scan of the index, which may have millions of rows.

The same type of optimization is possible for MAX using either a DESCENDING index or using reverse index scan on an ASCENDING index.

Figure 5:
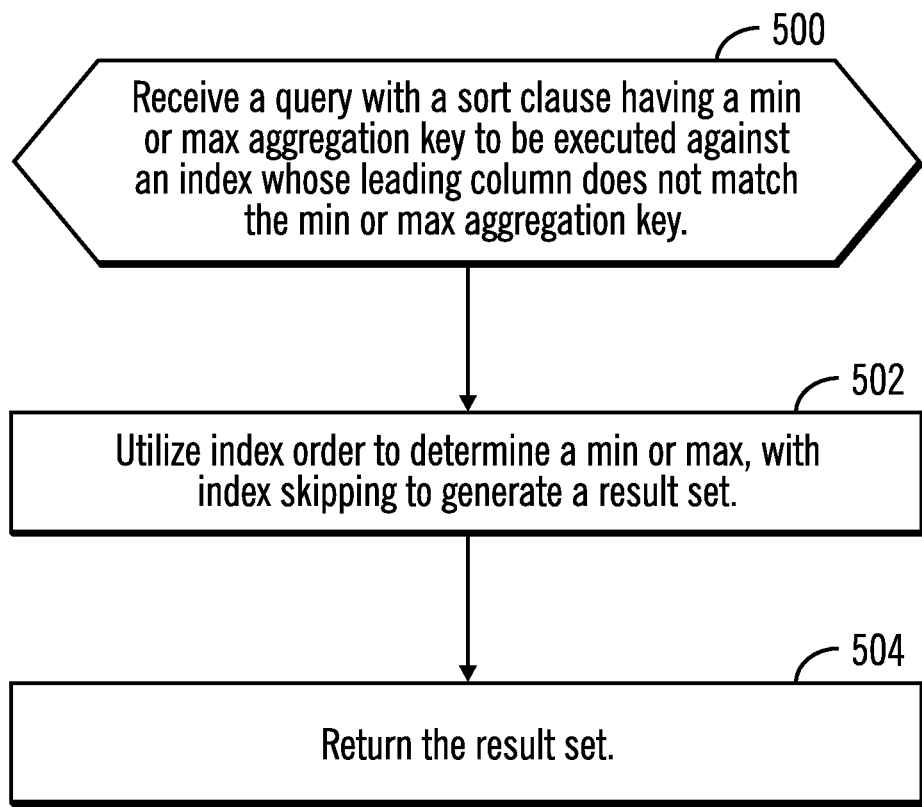
FIG. 5 illustrates, in a flow chart, operations for processing a minimum or maximum clause in accordance with certain embodiments.

FIG. 5 illustrates, in a flow chart, operations for processing a minimum or maximum clause in accordance with certain embodiments. Control begins at block 500 with the minimizing aggregation engine 120 receiving a query with a sort clause having a min or max aggregation key to be executed against an index whose leading column does not match the min or max aggregation key. In block 502, the minimizing aggregation engine 120 utilizes index order to determine a min or max, with index skipping to generate a result set with that determined min or max. In block 504, the minimizing aggregation engine 120 returns the result set.

Thus, embodiments reduce aggregation processing by exploiting an index whose one or more non-leading columns match one or more leading columns of an ORDER BY aggregation key in an ORDER BY clause, any column of a duplicate remove aggregation key in a duplicate removal clause, a MIN aggregation key in a MIN clause, and a MAX aggregation key in a MAX clause.

Figure 6:
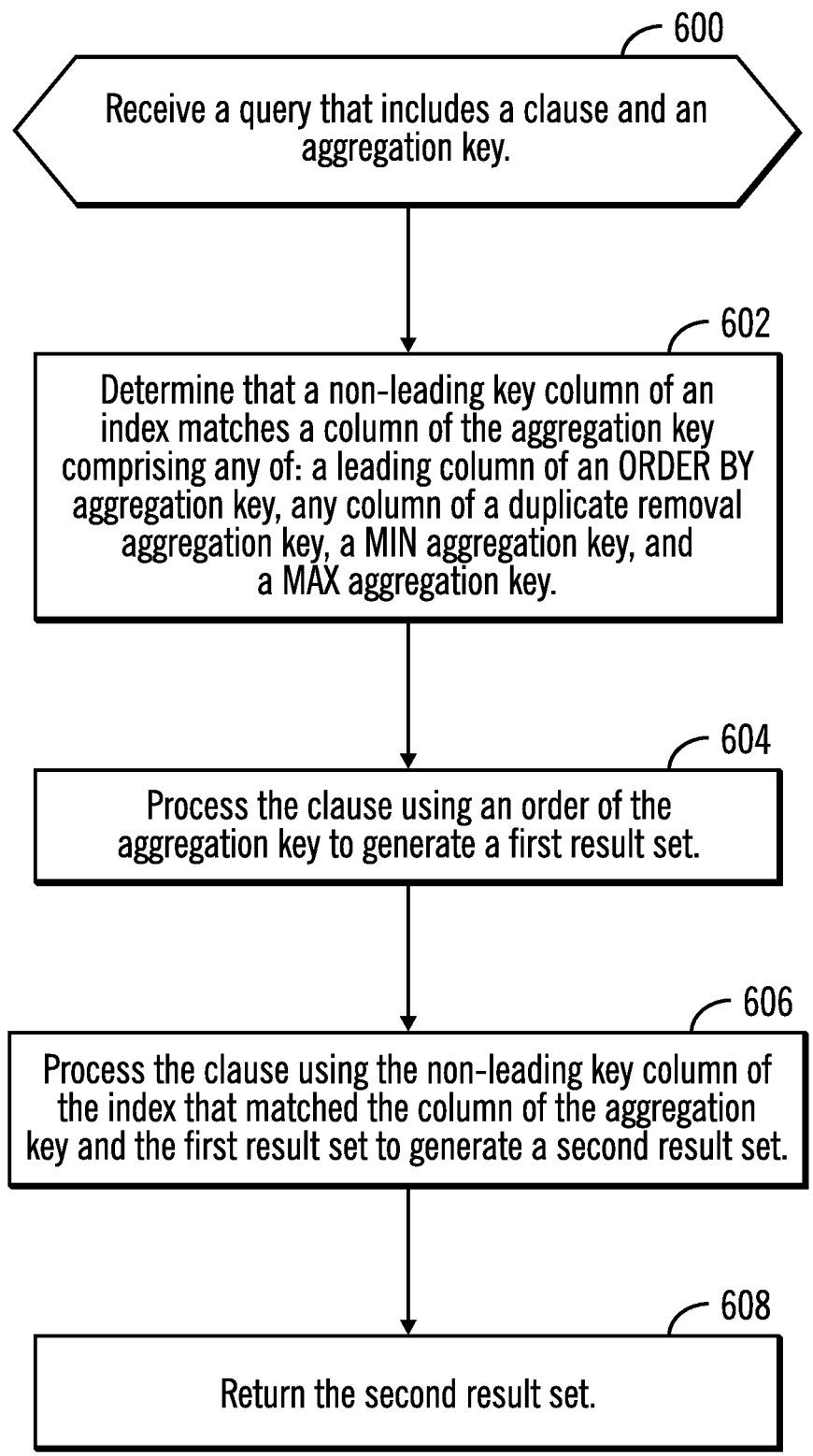
FIG. 6 illustrates, in a flow chart, operations for minimizing processing using an index when non-leading columns match an aggregation key in accordance with certain embodiments.

FIG. 6 illustrates, in a flow chart, operations for minimizing processing using an index when non-leading columns match an aggregation key in accordance with certain embodiments. Control begins at block 600 with the minimizing aggregation engine 120 receiving a query that includes a clause and an aggregation key. In block 602, the minimizing aggregation engine 120 determines that a non-leading key column of an index matches a column of the aggregation key comprising any of: a leading column of an ORDER BY aggregation key, any column of a duplicate removal aggregation key, a MIN aggregation key, and a MAX aggregation key. In block 604, the minimizing aggregation engine 120 processes the clause using an order of the aggregation key to generate a first result set. In block 606, the minimizing aggregation engine 120 processes the clause using the non-leading key column of the index that matched the column of the aggregation key and the first result set to generate a second result set. In block 608, the minimizing aggregation engine 120 returns the second result set.

Embodiments use non-leading key columns that match either the leading column of an ORDER BY aggregation key (or other ordering, in a clause such as SORT), any column of a duplicate removal aggregation key (in a clause such as GROUP BY, DISTINCT, UNION or non-correlated subquery), a MIN aggregation key (in a MIN clause) or a MAX aggregation key (in a MAX clause). With embodiments, the index superset of columns (as compared to the columns for ordering/duplicate removal) may be exploited to reduce the sort and scan requirement.

Thus, embodiments efficiently reduce aggregation processing and do not require indexes that match the ordering requirement.

Also, there are some cases that currently require the creation of additional indexes, which adds overhead to INSERT, UPDATE, DELETE and other database maintenance operations. However, the minimizing aggregation engine 120 uses existing indexes and avoids creating new indexes for a more efficient database.

Figure 7:
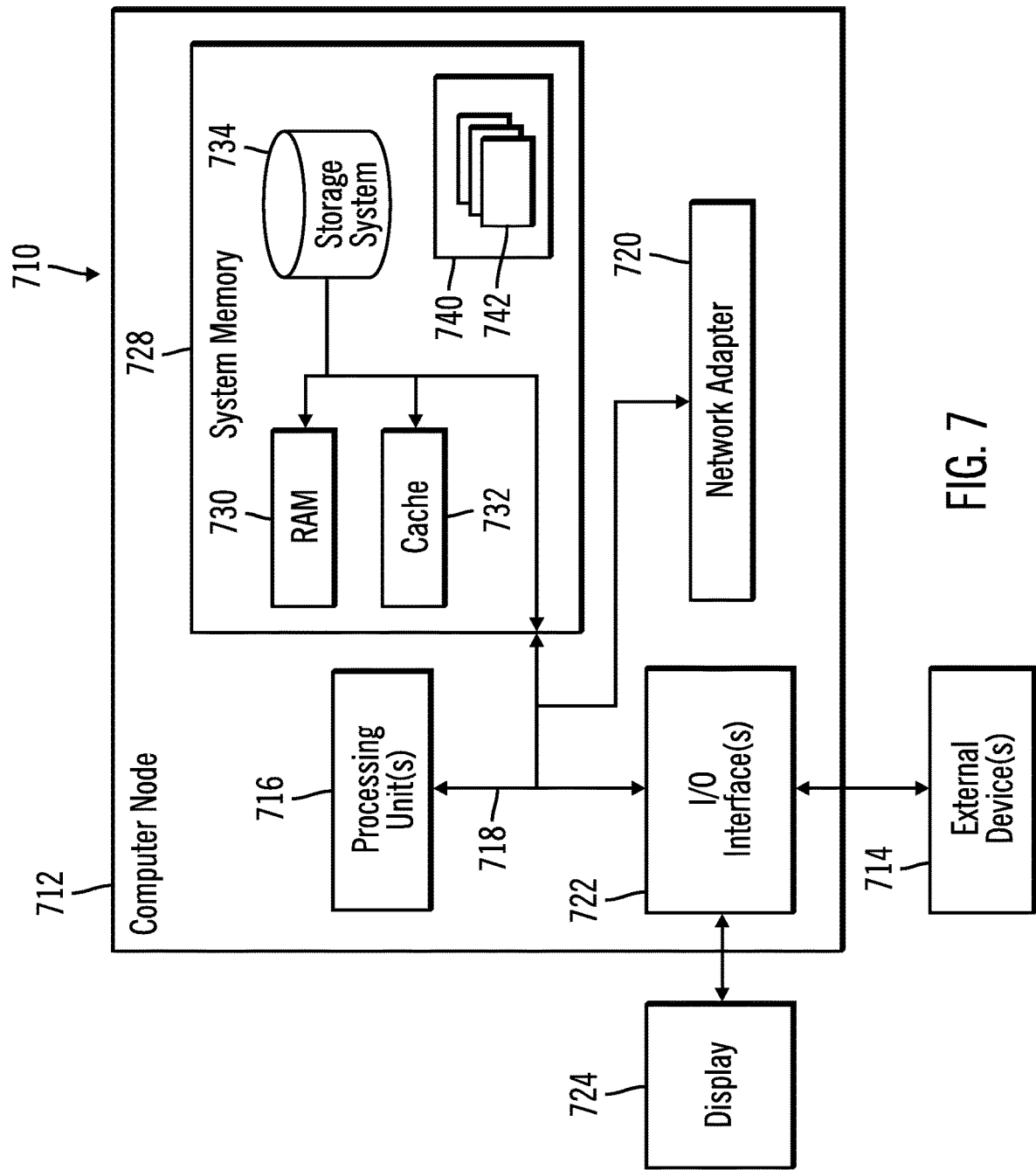
FIG. 7 illustrates a computing node in accordance with certain embodiments.

FIG. 7 illustrates a computing environment 710 in accordance with certain embodiments. In certain embodiments, the computing environment is a cloud computing environment. Referring to FIG. 7, computer node 712 is only one example of a suitable computing node and is not intended to suggest any limitation as to the scope of use or functionality of embodiments of the invention described herein. Regardless, computer node 712 is capable of being implemented and/or performing any of the functionality set forth hereinabove.

The computer node 712 may be a computer system, which is operational with numerous other general purpose or special purpose computing system environments or configurations. Examples of well-known computing systems, environments, and/or configurations that may be suitable for use with computer node 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 712 may be described in the general context of computer system executable instructions, such as program modules, being executed by a computer system. Generally, program modules may include routines, programs, objects, components, logic, data structures, and so on that perform particular tasks or implement particular abstract data types. Computer node 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer node 712 is shown in the form of a general-purpose computing device. The components of computer node 712 may include, but are not limited to, one or more processors or processing units 716, a system memory 728, and a bus 718 that couples various system components including system memory 728 to one or more processors or processing units 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 712 typically includes a variety of computer system readable media. Such media may be any available media that is accessible by computer node 712, and it includes both volatile and non-volatile media, removable and non-removable media.

System memory 728 can include computer system readable media in the form of volatile memory, such as random access memory (RAM) 730 and/or cache memory 732. Computer node 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, system memory 728 may include at least one program product having a set (e.g., at least one) of program modules that are configured to carry out the functions of embodiments of the invention.

Program/utility 740, having a set (at least one) of program modules 742, may be stored in system memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer node 712 may also communicate with one or more external devices 714 such as a keyboard, a pointing device, a display 724, etc.; one or more devices that enable a user to interact with computer node 712; and/or any devices (e.g., network card, modem, etc.) that enable computer node 712 to communicate with one or more other computing devices. Such communication can occur via Input/Output (I/O) interfaces 722. Still yet, computer node 712 can communicate with one or more networks such as a local area network (LAN), a general wide area network (WAN), and/or a public network (e.g., the Internet) via network adapter 720. As depicted, network adapter 720 communicates with the other components of computer node 712 via bus 718. It should be understood that although not shown, other hardware and/or software components could be used in conjunction with computer node 712. Examples, include, but are not limited to: microcode, device drivers, redundant processing units, external disk drive arrays, RAID systems, tape drives, and data archival storage systems, etc.

In certain embodiments, the server computer 100 and the client computer 190 each has the architecture of computer node 712. In certain embodiments, the server computer 100 and the client computer 190 each are part of a cloud infrastructure. In certain alternative embodiments, the server computer 100 and the client computer 190 are not part of a cloud infrastructure.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
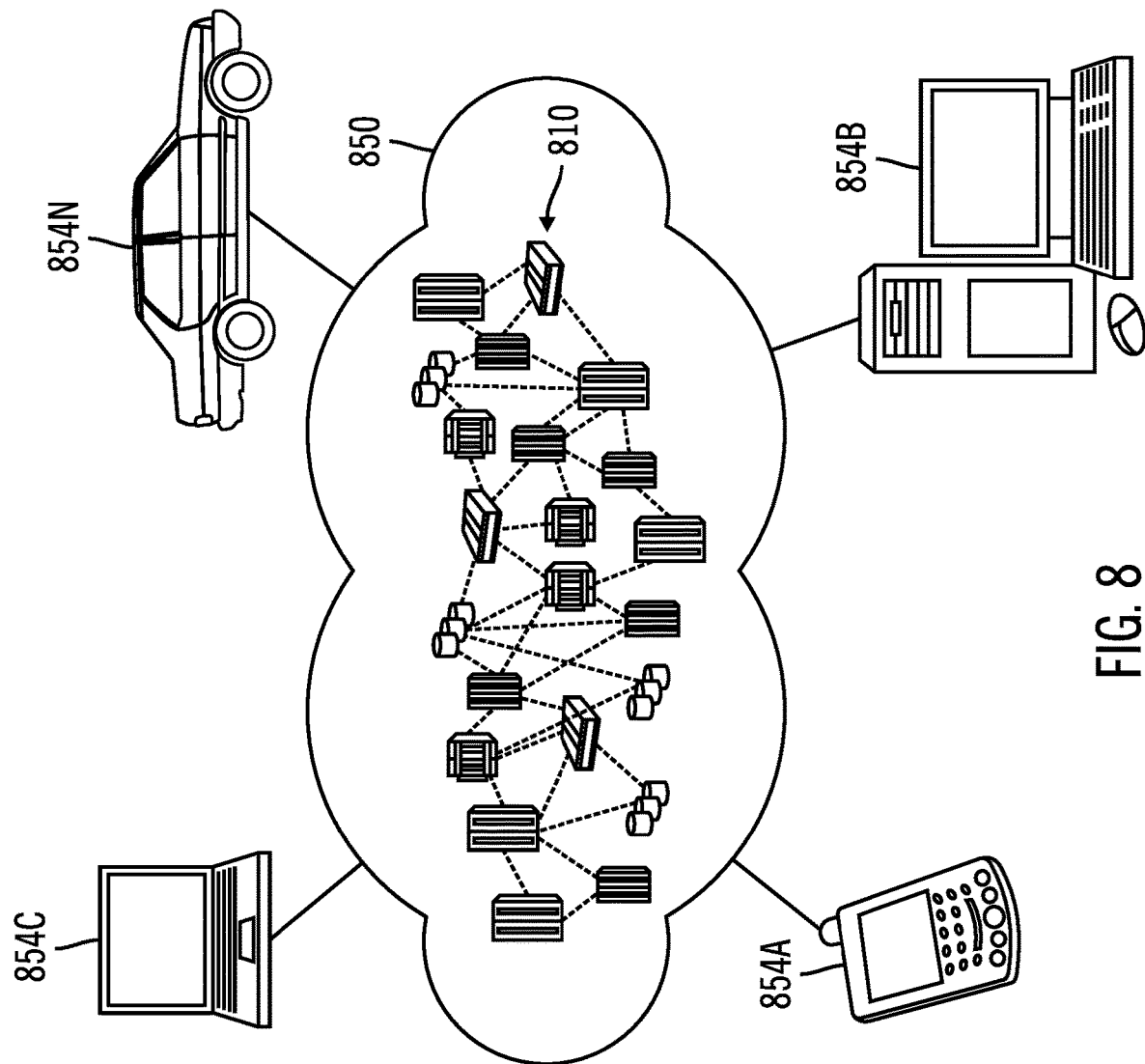
FIG. 8 illustrates a cloud computing environment in accordance with certain embodiments.

Referring now to FIG. 8, illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
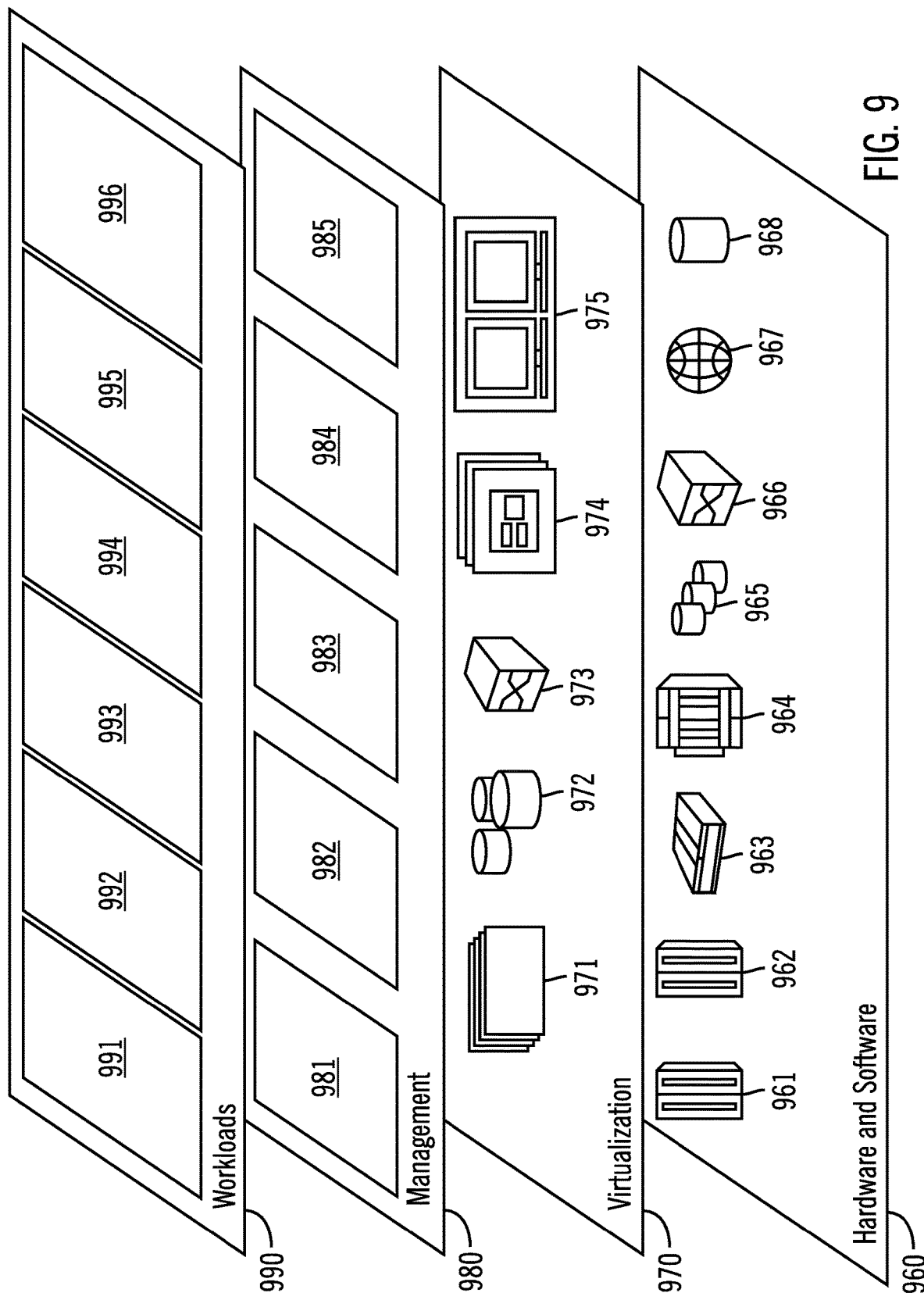
FIG. 9 illustrates abstraction model layers in accordance with certain embodiments.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and minimizing processing using an index when non-leading columns of the index match columns of an aggregation key 996

Thus, in certain embodiments, software or a program, implementing minimizing processing using an index when non-leading columns of the index match columns of an aggregation key in accordance with embodiments described herein, is provided as a service in a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising operations for:
    receiving, with a processor of a computer, a query that includes a clause and an aggregation key, wherein the aggregation key comprises columns;
    searching through each index of a plurality of indexes for one of: a first column of a sort aggregation key, any column of a grouping aggregation key, and any column of a duplicate removal aggregation key;
    in response to finding an index that has a leading column that matches one of: the first column of the sort aggregation key, any column of the grouping aggregation key, and any column of the duplicate removal aggregation key, performing a partial ordering approach; and
    in response to finding an index that has a non-leading column that matches one of: the first column of the sort aggregation key, any column of the grouping aggregation key, and any column of the duplicate removal aggregation key, performing a minimizing aggregation approach by:
        processing, with the processor of the computer, the clause using an order of columns of the index to generate a first result set; and
        processing, with the processor of the computer, the clause using non-leading key columns of the index that matched the columns of the aggregation key and the first result set to generate a second result set; and
        returning, with the processor of the computer, the second result set.

2. The computer-implemented method of claim 1, wherein the clause comprises a duplicate removal clause that is any of a GROUP BY clause, a DISTINCT clause, a UNION clause, and a non-correlated subquery.

3. The computer-implemented method of claim 1, further comprising operations for:
    performing duplicate skipping when searching the index to generate the first result set.

4. The computer-implemented method of claim 1, further comprising operations for:
    performing parallel processing with child tasks reporting to parent tasks.

5. The computer-implemented method of claim 1, wherein, for the partial ordering approach, a partial order provided by the index is used to reduce processing for the aggregation key.

6. The computer-implemented method of claim 1, wherein a Software as a Service (SaaS) is configured to perform the operations of the method.

* * * * *